United States Patent
Schlecht et al.

(10) Patent No.: US 6,840,562 B2
(45) Date of Patent: Jan. 11, 2005

(54) WINDUP WINDOW SHADE WITH VARIABLE SHADING EFFECT

(75) Inventors: Werner P. Schlecht, Vaihingen/Enz (DE); Herbert Walter, Ebersbach (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 10/679,270

(22) Filed: Oct. 7, 2003

(65) Prior Publication Data

US 2004/0066059 A1 Apr. 8, 2004

Related U.S. Application Data

(62) Division of application No. 09/989,467, filed on Nov. 21, 2001, now Pat. No. 6,695,381.

(30) Foreign Application Priority Data

Nov. 22, 2000 (DE) .......................... 100 57 764

(51) Int. Cl.[7] .................. B60J 1/20; B60J 3/02
(52) U.S. Cl. .................... 296/97.9; 296/97.8; 296/97.7; 296/97.4; 160/370.22; 160/265
(58) Field of Search .................. 296/97.4, 97.7, 296/97.8, 97.9, 97.11; 160/265, 370.22

(56) References Cited

U.S. PATENT DOCUMENTS

| | | | |
|---|---|---|---|
| 1,406,499 A | | 2/1922 | Sanberg |
| 2,547,373 A | * | 4/1951 | Camp |
| 2,678,183 A | * | 5/1954 | Bell |
| 3,183,033 A | * | 5/1965 | Stulbach |
| 4,335,773 A | | 6/1982 | Masi |
| 4,657,807 A | * | 4/1987 | Fuerstman ................ 428/263 |
| 4,874,026 A | * | 10/1989 | Worrall .................. 160/23.1 |
| 5,042,866 A | * | 8/1991 | Cody ..................... 296/97.8 |
| 5,089,912 A | * | 2/1992 | Simin .................... 296/97.8 |
| 5,098,149 A | * | 3/1992 | Lee ....................... 296/97.8 |
| 5,101,878 A | * | 4/1992 | Thomas ................... 296/97.8 |
| 5,133,585 A | * | 7/1992 | Hassan ................... 296/97.8 |
| 5,165,188 A | * | 11/1992 | Tsiros ..................... 49/63 |
| 5,201,810 A | * | 4/1993 | Ojima et al. .............. 160/265 |
| 5,287,908 A | * | 2/1994 | Hoffmann et al. ....... 160/121.1 |
| 5,392,549 A | * | 2/1995 | Castro ................. 160/370.22 |
| 5,404,926 A | * | 4/1995 | Ojima et al. .............. 160/280 |
| 5,647,421 A | * | 7/1997 | Hoffmann et al. ......... 160/120 |
| 6,070,639 A | * | 6/2000 | Winston et al. ........... 160/120 |
| 6,109,330 A | | 8/2000 | Crisp |
| 6,131,987 A | * | 10/2000 | Rossiter ................ 296/97.8 |
| 6,189,592 B1 | * | 2/2001 | Domel .................... 160/85 |
| 6,267,431 B1 | * | 7/2001 | Watkins ................. 296/97.4 |
| 6,276,429 B1 | * | 8/2001 | Chen .................... 160/231.1 |
| 2002/0033244 A1 | * | 3/2002 | Schlecht et al. ....... 160/370.22 |

FOREIGN PATENT DOCUMENTS

| | | |
|---|---|---|
| DD | 28 41 218 | 4/1980 |
| DD | 36 12 165 | 10/1987 |
| DE | 196 19 474 | 11/1997 |
| DE | 196 41 554 | 5/1998 |
| DE | 296 21 563 | 5/1998 |
| FR | 2 786 734 | 6/2000 |

* cited by examiner

Primary Examiner—D. Glenn Dayoan
Assistant Examiner—H. Gutman
(74) Attorney, Agent, or Firm—Venable LLP; Stuart I. Smith

(57) ABSTRACT

A windup window shade is provided with windup window shade mechanism which, in the extracted state, make possible different degrees of opacity at the window. To this end, the two window shade web can either be wound on separate windup shafts and spread out in the same direction from the same starting point, or the two window shade webs have been connected with each other and, after having been extended, are moved in the manner of a film in front of the window. Two windup shafts are employed in both cases, wherein in the one case the two windup shafts are located directly next to each other, while in the other case the windup shafts are separated from each other during the extension of the shade.

17 Claims, 8 Drawing Sheets

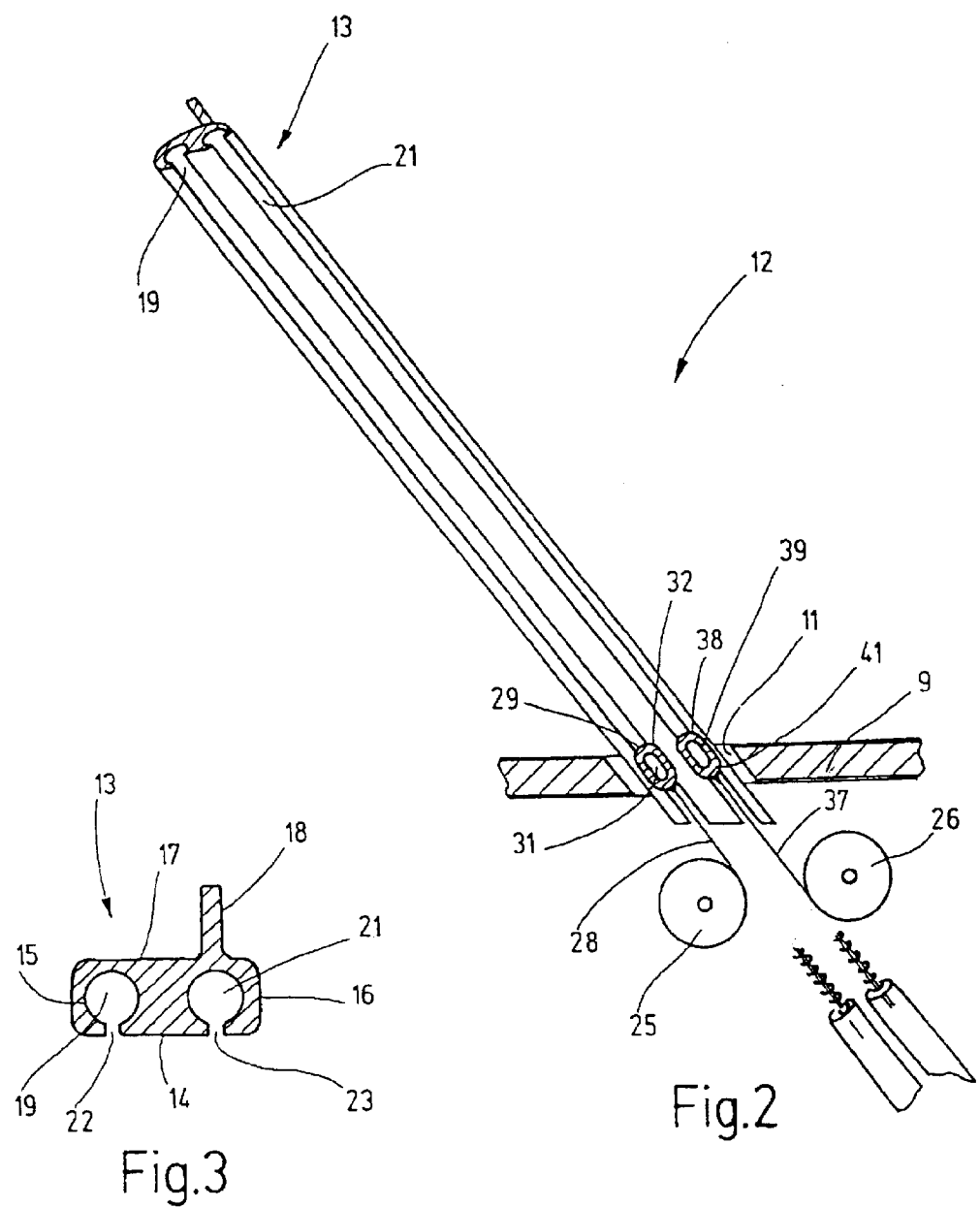

WINDUP WINDOW SHADE WITH VARIABLE SHADING EFFECT

CROSS REFERENCE TO RELATED APPLICATION

This application is a division of allowed U.S. application Ser. No. 09/989,467 now Pat. No. 6,695,381 filed Nov. 21, 2001 the subject matter of which is incorporated herein by reference.

This application claims the priority of German Patent Application, 100 57 764.4 filed Nov. 22, 2000.

BACKGROUND OF THE INVENTION

Modern automobile body shapes are distinguished by relatively large window areas. Because of strong sunlight, the large window areas result in considerable heat generation in the interior of the vehicle and, in connection with vehicles with air conditioning, this major heat generation results in a considerable use of energy in order to counteract the heating effects on the vehicle.

For this reason, motor vehicles are increasingly equipped with windup window shades. A rear window windup shade is known from DE 36 12 165 A1, which has a windup shaft which is rotatably seated in a base. The base is located on or underneath the rear window shelf. The window shade web of the rear window windup shade is pulled out from the rear window shelf in the direction toward the rear edge of the roof. The windup shaft, which is rotatably seated in the base and is biased by a spring drive in the windup direction, is used for storing the unused part of the window shade web. A traction rail is fastened on the edge of the window shade web remote from the windup shaft. With the aid of second pivot levers, the traction rail is transferred from a position in which it directly adjoins the windup roller into a position in which the window shade web covers nearly the entire window. For this purpose the pivot levers are essentially rigid in the direction perpendicular to that plane in which they move in the course of the retraction and extension of the windup shade.

Only two settings for light penetration through the rear window are possible with the known blind. In one state light can enter unhampered through the rear window, because the windup shade is completely wound on the windup roller, while in the other state a reduction occurs in accordance with the permeability to light of the windup shade web.

It is furthermore known to attach two guide rails laterally next to the window, in which the end of the traction rod of the window shade web is guided. The length of the traction rod is adjustable in order to be able to accommodate various window widths. Actuation takes place by means of the thrust members running in the guide rails.

Only two states are possible here, too, namely the unhampered entry of light or reduction in accordance with the reduction effects of the windup shade web.

SUMMARY OF THE INVENTION

Based on the foregoing it is the object of the invention to create a windup window shade for motor vehicles, which allows a total of three operational states, wherein a different reduction of the entry of light over the entire window area can be set.

It is possible by means of the windup window shade of the invention to achieve at least two additional shading states in addition to the completely unaffected light entry.

These different states can be achieved with window shade means comprising two window shade webs, which can be extended alternatively or simultaneously.

In one of the embodiments, the window shade means of the windup window shades are connected with each other along an edge, so that either no window shade web at all or one or the other window shade web can be pulled in front of the window. The other variation provides two window shade webs, which are separate from each other and can be actuated independently of each other to the greatest extent.

One of the window shade webs can be made of a woven material or a perforated foil in order to permit light into the car interior in a metered manner. The other window shade web can be completely dark, or for example also be provided with a metallized coating in order to completely block the entry of infrared light into the interior of the car. Moreover, the opaque window shade web has the advantage of preventing a view of the car interior, which is advantageous in particular in parked vehicles.

Guide means are assigned to the windup window shade means for maintaining the extended state. These guide means can consist of guide rails or pivot levers. The variation with the guide rails makes it possible to cover the windows to the greatest extent. To this end two guide rails extend next to the edges of the window, which follow the contours of the window. At least one traction rod, sometimes called a traction rail herein, on which an edge of the respective window shade web is fastened, runs in these guide rails.

With the embodiment with two independent window shade webs, the guide rails have two guide grooves on each side, wherein one guide groove of each guide rail is assigned to the one window shade web, and the other to the other window shade web.

So that the traction rails can follow the trapezoidal or converging shape, the respective traction rail is embodied to be adjustable in length.

The retraction and extension of the respective window shade web can take place in that the respective traction rail is driven by an electric motor. Thrust or pressure members are provided for this, which are put in motion by the motor and move the ends of the respective traction rail in the guide groove. The window shade webs are suitably biased in the retraction direction by means of spring drives.

The variation with two window shade webs can also be controlled very simply with only a single motor. To this end, one end of the linearly-shaped pressure member is coupled with the traction rail of the one window shade web, and the other end with the traction rail of the other window shade web. In other words, the return strand of the thrust member on the part of one window shade web is at the same time the driving strand on the part of the other window shade web. Cross-coupling is achieved in this way, which provides that both window shade webs are retracted in the center position of the thrust member. If the thrust member is extended in the one direction, one of the window shade webs is extended, while during the extension in the opposite direction the other window shade web is pulled out. In the center position both window shade webs are retracted.

The thrust or pressure members are preferably approximately cylindrical structures, which are provided with teeth on the exterior. Because of the approximately dynamically balanced design it is possible to overcome curved guides easily. Such a thrust member is obtained if an essentially cylindrical core is provided with a helically extending rib. Such thrust members are flexible shafts known in actual use under the commercial designation SUFLEX™ shafts.

Actuation of the individual window shade webs becomes simple if an individual windup shaft is provided for each window shade web. Each one of the windup shafts is biased in the retracting direction of the respective window shade web by its own spring drive.

To prevent the skewed pulling of the window shade web, which results in obliquely extending waves in the window shade web, it is practical to seat the respective windup shaft in a hoop, which itself is also pivotable in respect to the drive direction, or to the guide rails, namely around an axis extending perpendicularly in respect to the axis of the windup shaft. An offset, which is created when the thrust members in the respective guide rails are not exactly at the same effective height, can be compensated by means of such seating. In this case effective height is understood to be the effective distance of the end of the thrust member from the axis of the windup shaft. Different effective heights would mean that on the one edge the traction rail of the respective window shade web would be forced to be at a greater effective distance from the windup shaft than on the other edge, because of which the window shade web is deformed and tends to develop folds.

As already expressed at the outset, the option of achieving different grades of shade can also be created with the aid of pivot levers. The pivot levers can either be simple rigid levers or toggle levers. In either case, one end of the levers is seated pivotable around shafts which extend at right angles in respect to the axis of the windup shaft.

A traction rod, on which a further windup shaft is rotatably seated, is moved away from or toward the windup shaft with the aid of the pivot levers. In this case the windup window shade means consist of two window shade webs, fastened one behind the other in the direction of movement which, similar to a film in a camera, are moved back and forth between the two windup shafts. In the last mentioned option it is necessary for the leading window shade web to have a rectangular shape, so that it can be completely wound on the respective windup shaft seated on the traction rod. Because of the trapezoid window geometry, the traction rod as a rule is considerably shorter than would correspond to the width of the window in the lower area. Only the second window shade web can be matched to the trapezoidal window geometry.

BRIEF DESCRIPTION OF THE DRAWINGS

Exemplary embodiments of the subject of the invention are represented in the drawings.

FIG. 2 shows the basic structure of the rear window windup shade in accordance with FIG. 1.

FIG. 3 illustrates the guide rail of the rear window windup shade in accordance with FIG. 1 in a cross-sectional view.

DETAILED DESCRIPTION OF THE PREFERRED EMBODIMENTS

Figure 1:
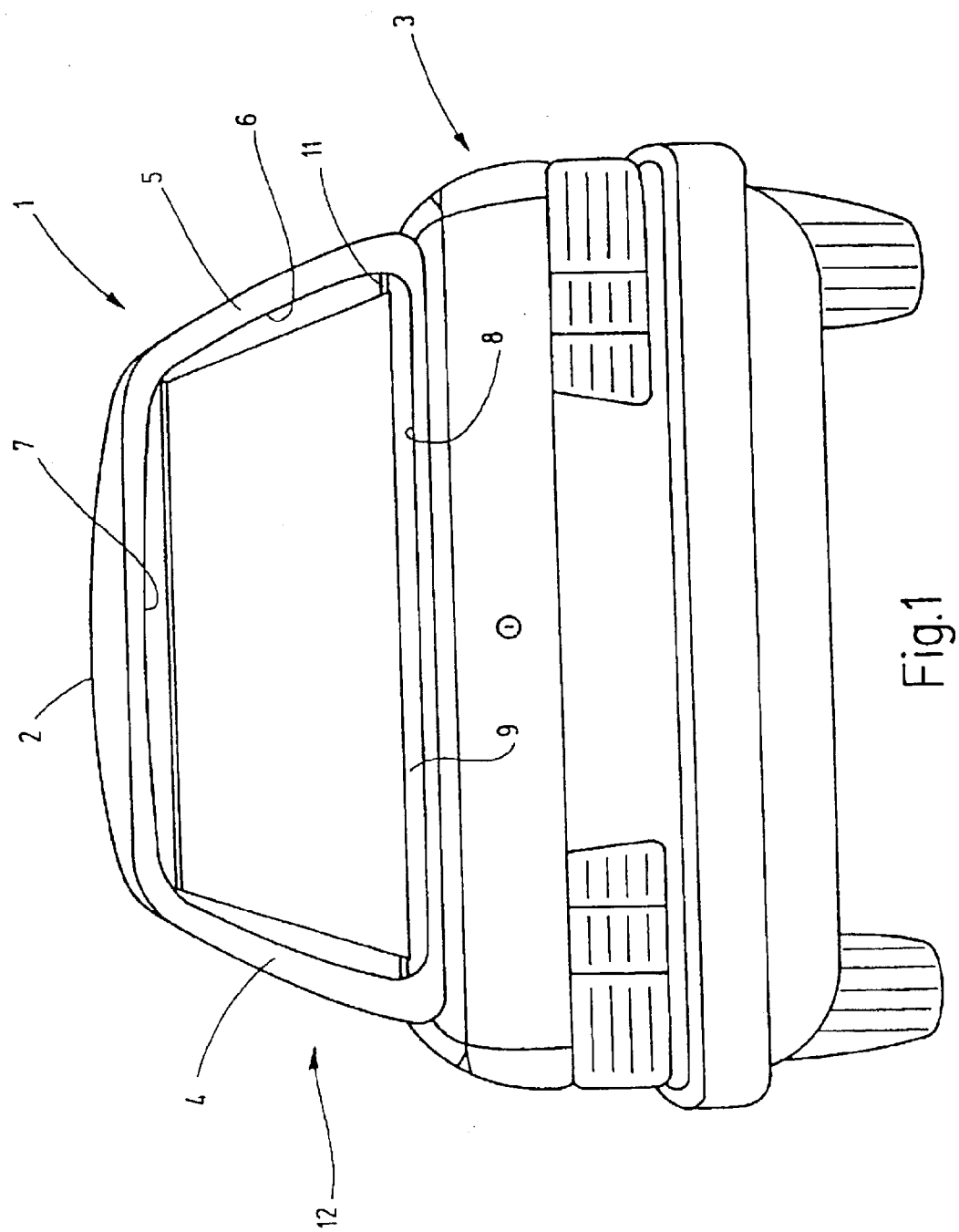
FIG. 1 shows a passenger car in a rear view, showing a rear window windup shade in accordance with the invention in the extended state.

In a schematic representation, FIG. 1 shows a rear view of a passenger car 1, having a roof 2, a trunk 3, as well as two C-pillars 4 and 5. A rear window opening 6, which is bordered at the top by a rear edge 7 of the roof and on the bottom by a lower window edge 8, is located between the two C-pillars 4 and 5. A rear window pane is seated in the rear window opening 6 in a known manner, for example glued in by means of a window rubber strip.

A rear window shelf 9 is located in the interior of the passenger car 1 in front of the rear window, which extends between the lower window edge 8 and the backrest of a rear seat, not visible in the drawing. A straight outlet slit 11 extends in the rear window shelf 9.

The outlet slit 11 is a part of a rear window windup shade 12, whose basic structure is shown, greatly schematized, in a lateral view in FIG. 2.

The rear window windup shade 12 has two guide rails, which are fastened next to the lateral edges of the rear window opening 6 on both C-pillars 4 and 5. Because of the cut-open basic representation, only one guide rail 13, which for example is fastened on the C-pillar 5, can be seen in FIG. 2.

The guide rail 13 has the cross-sectional profile represented in FIG. 3. It is essentially square in cross section and is bordered by a front 14, two lateral walls 15 and 16, as well as by a back 17. A strip-like fastening flange 18 extends from the back 17, with the aid of which the guide rail 13 is to be attached to appropriate parts of the vehicle body.

Two guide grooves 19 and 21, which are located parallel next to each other, are circular in cross section and open via slits 22 and 23 toward the front 14, are contained in the guide rail 13. The two guide grooves 19 and 21 are identical in cross section and extend along the guide rail 13 parallel and at equal distances.

The guide rail 13 is for example made of an extruded aluminum profile.

Since the slits 22, or 23 are narrower than the diameter of the circular section of the guide grooves 19, or 21, undercut grooves are created, which are suitable for protecting a linearly shaped thrust member against buckling and, by means of an appropriate cross section, to prevent the thrust member of an appropriate diameter from passing through the slit 22, or 23 to the outside.

The guide rails 13 are bent in respect to several axes so that they follow the contour of the window edge without becoming visible in the window itself. The guide rails 13 are arranged in such a way that the grooves 19 and 21 are located one behind the other in the longitudinal extension of the vehicle, i.e. in relation to a vertical section through the vehicle, which follows the vehicle longitudinal axis, they lie next to each other, so that the one guide groove is located toward the trunk 3, and the other guide groove more toward the vehicle interior.

As FIG. 2 shows, the guide rails 13 extend downward through the slit 11 to below the rear window shelf 9.

Figure 4:
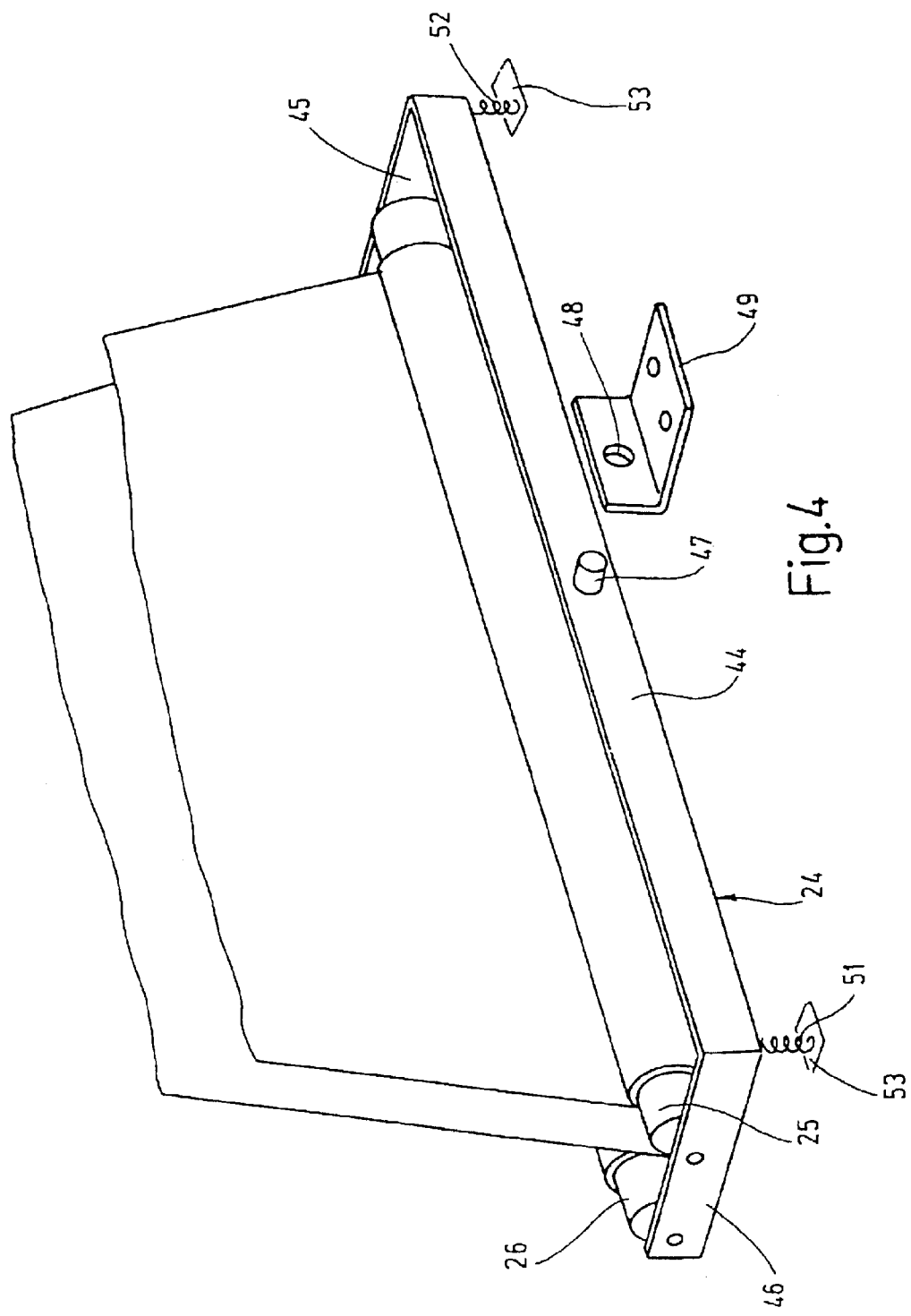
FIG. 4 illustrates the seating of the windup shafts of the rear window windup shade in accordance with FIG. 1 in a simplified schematic representation.

As indicated in FIG. 4, two windup shafts 25 and 26, sometimes referred to herein as windup rollers, which wind in opposite directions, are rotatably seated in a seating hoop 24. Each one of the windup shafts 25 and 26 is tube-shaped and houses a spring drive. This spring drive for the windup shaft 26 is schematically represented at 27 in FIG. 5. The spring drive 27 consists of a helical spring, one end of which is fastened in the interior of the respective windup roller and the other end of which is anchored to a seating hoop 24.

Figure 5:
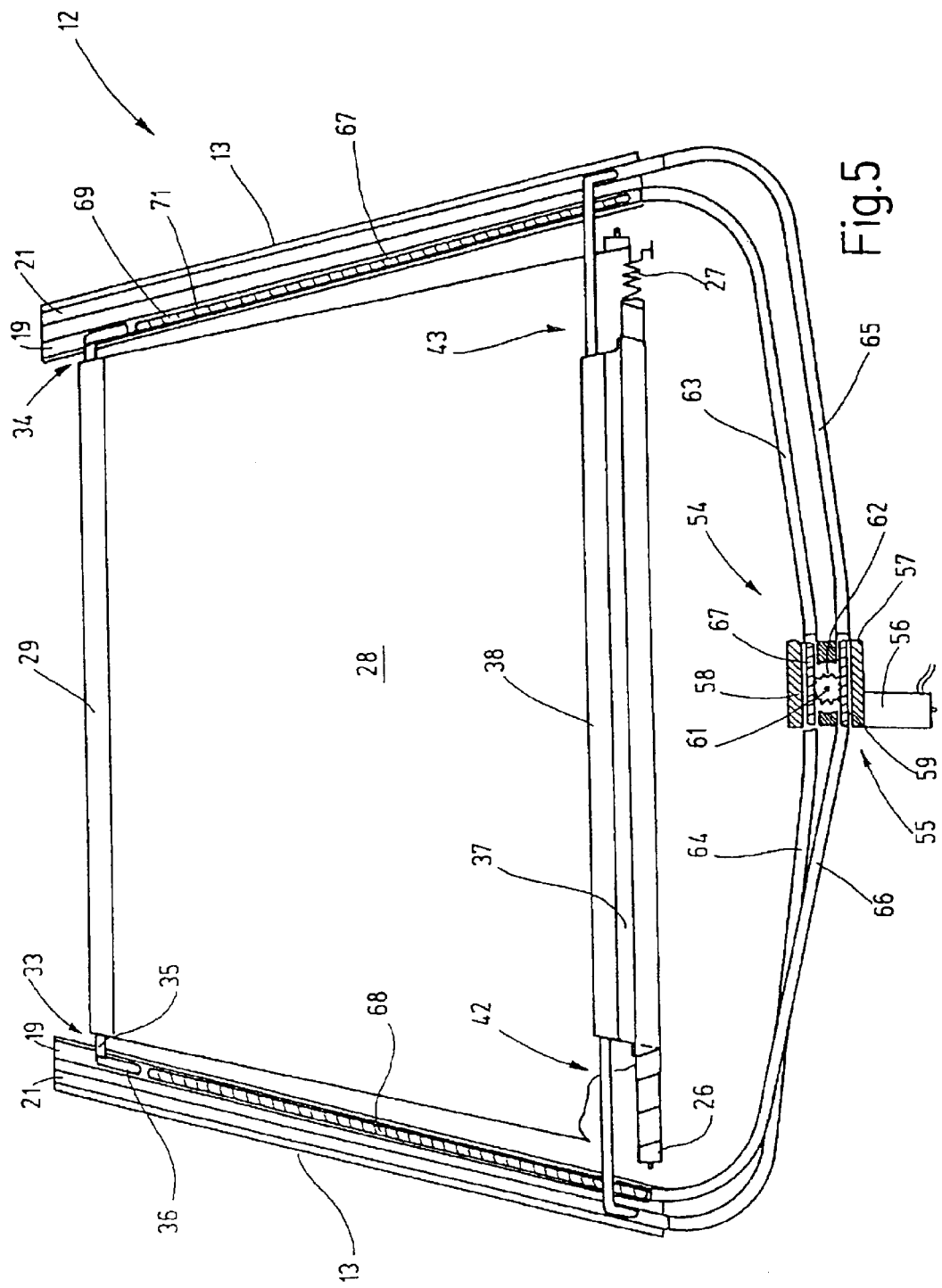
FIG. 5 illustrates the drive mechanism of the rear window windup shade in accordance with FIG. 1 in a simple schematic representation.

A window shade web 28 is fastened with one edge on the windup roller 25 located toward the interior of the vehicle, whose shape is a trapezoidal approximation of the contour of the rear window 6. The edge remote from the windup roller 25 is formed into a hose-shaped loop 29, in which a traction rod 31 is seated. The traction rod 31 consists of a dimensionally stable tube 32, into which two L-shaped guide members 33 and 34 have been inserted from both ends, as illustrated in FIG. 5.

The guide member 33 consists of a long leg 35, which can be displaced in the dimensionally stable tube 32 and of a leg 36 which is angled off in an L-shape. The leg 35 is matched to the cross section of the dimensionally stable tube 32 and its dimensions are such that it can reach through the slit 22, or 23, into the interior of the respective guide groove 19 or 21. But the leg 36 is matched to the cross section of the circular part of the guide grove 19 or 21. In this way the leg 35 can be longitudinally displaced in the dimensionally stable tube 32, and the leg 36 can move along the respective guide groove 19, 21. It cannot be pulled laterally out of the slit 22, 23.

The guide member 34 has the same structure as the guide member 33, so that another explanation can be omitted.

A further window shade web 37 is attached to one end of the windup shaft 26, which also forms a loop 38 at its edge remote from the windup shaft 26. A longitudinally adjustable traction rail 39 is seated in the loop 38. It consists of a dimensionally stable tube 41, whose length corresponds to the edge and in which two guide members 42 and 43 are guided, which have the same structure as that extensively explained in connection with the guide member 33.

The window shade webs 28 and 37 run off between the windup shafts 25, 26.

The seating hoop 24 for seating the two windup shafts 25 and 26 is a U-shaped structure, having a rear element 44 and two legs 45 and 46 extending at right angles therefrom, in which the windup shafts 25 and 26 are rotatably seated by means of appropriate bearing journals.

A bearing journal 47 is located in the center of the rear element 44, whose axis extends at right angles to the axes of the two windup shafts 25 and 26, which are axis-parallel with each other. The bearing journal 47 is seated in a bearing bore 48 of a holder 49, which is fixedly anchored in the vehicle underneath the rear window shelf 9. In this way the two windup shafts 25 and 26 can rotate, limited in respect to the axis defined by the bearing journal 47.

The middle position, i.e. the centered position, is defined by two compression springs 51 and 52, one end of which is supported on the seating hoop 24, and the other on a rest 53 which is fixed in place on the vehicle body and is schematically indicated. The two springs 51 and 52 are seated on the transition point of the rear element 44 in the respective legs 45 or 46, so that equal torques are generated.

A drive mechanism 54, which is represented in a greatly schematized manner in FIG. 5, is provided for extending the window shade webs 28 and 37. To simplify the representation and to make the understanding of the invention easier, the two lateral guide rails 13 are represented rotated in section in FIG. 5 in such a way that the two guide grooves 19 and 21 are located next to each other in the drawing plane. As stated, this illustration is merely provided for making understanding easier. In actuality the two guide grooves 19 and 21 are located behind each other and also open in the direction toward each other and not in the direction toward the viewer.

A gear motor 55 is a part of the drive mechanism 54, which is composed of a permanently excited direct current (d.c.) motor 56 and a gear housing. Two guide channels 58 and 59 are contained parallel to each other in the gear housing, between which an output gear wheel 62 is provided on an output shaft 61. The output gear wheel 62 can be selectively put into motion in both directions of rotation by means of the output shaft 61, which is connected with it fixed against relative rotation.

A guide tube 63 runs from the guide channel 58 to the lower end of the guide groove 19 in the right guide rail 13. A further guide tube 64 connects the other end of the guide channel 58 with the lower end of the guide groove 21 in the left guide rail 13. At the right end, the guide channel 59 is connected via a guide tube 65 with the lower end of the guide groove 21 in the right guide rail 13, and at the left end via a guide tube 66 with the lower end of the guide groove 19 in the guide rail 13. A flectionally elastic, linearly-shaped thrust member 67, or 68, extends through the guide channel 58, as well as through the guide channel 59. The lengths of the two thrust members 67 and 68 are of such dimensions that, in the neutral position, they just do not project into the associated guide grooves 19, or 21.

The two thrust members 67 and 68 are identically constructed. Each consists of an elastically flexible cylindrical core 69, which has one or several ribs 71 on its exterior, which form a single- or multi-start screw thread there. The ribs 71 protrude radially and run helically over the cylindrical core 69 from one end of the thrust member to the other end. The output gear wheel 62 has teeth which can enter between the grooves formed by the ribs 71. In this way the output gear wheel 62 is interlockingly coupled with the thrust members 67 and 68.

The mode of functioning of the described rear window windup shade is as follows:

In the position of rest, the windup shafts 25, 26 have been rotated by the action of the respective spring drives 27 into a position in which the window shade webs are wound up. In this position the hose-like loops 29 and 38 are located in the outlet slit 11, as can be seen in FIG. 2. The guide members 33, 34 and 42, 43 are located in the vicinity of the lower ends of the two guide rails 13, but without the legs 36 having been released out of the associated guide grooves 19 and 21. For the guide members 42 and 43 this position is shown in FIG. 5. The guide members 33 and 34 take up a similar position and, if they had been drawn in FIG. 5, would be concealed by the guide members 42 and 43.

At the same time the two ends of the thrust members 67 and 68 are spaced apart from the respective legs 36.

If, starting from this position of the rear windup window shade 12, in which the entry of light into the vehicle interior is not hampered at all, the user would like to create a first shading effect, he would extend the window shade web 28, for example. The window shade web 28 reduces the entry of light, but without stopping it completely. For this purpose the window shade web 28 is made, for example, of an open chain weave, or a perforated plastic foil, which is colored black.

To extend the window shade web 28, the gear motor 55 is put into operation in a direction of rotation in which it moves the thrust member 67 toward the right through the guide groove 19. Since the two thrust members 67 and 68 mesh with the output gear wheel 62 at diametrically opposite ends, the thrust member 68 is simultaneously pushed forward toward the left through the guide groove 19 and the left guide rail 13. After a short distance over the advance path, the free ends of the two thrust members 67 and 68 come into engagement with the lower ends of the legs 36 of the two guide members 33 and 34, and in the further process push the guide members 33 and 34 in the direction toward the upper end of the two guide rails 13.

Since the distance between the guide rails changes, the legs 35 of the guide members 33 and 34 simultaneously dip into the dimensionally stable tube 33 of the traction rail 31 contained in the respective loop 29.

As soon as the end position has been reached, the gear motor 55 is stopped. The gear motor 55 is self-locking and arrests the thrust members 67 and 68 in their respectively reached positions.

The switch-off of the gear motor 55 is performed with the aid of limit stop switches, or in that the guide members 33 and 34 run up against stops, so that a blocking current occurs, which is evaluated in an electronic device and leads to switch-off.

The window shade web 28 is now held stretched between the traction rail 31 and the respective windup shaft 25.

For retraction, the gear motor 55 is started in the opposite direction of rotation, so that the two guide members 67 and 68 are moved downward out of the associated guide rails 13. The traction rail 31 simultaneously moves downward, because the window shade web 28 is constantly kept under tension by the action of the spring drive 27 of the windup shaft 25.

As soon as the window shade web 28 is completely wound, the ends of the traction members 67 and 68 are freed from the guide members 33 and 34. This centered middle position can also be detected by limit stop switches and results in the stop of the gear motor 55.

If, following the complete retraction of the window shade web 28, the gear motor 55 remains switched on in the same direction of rotation, the thrust member 67 is pushed forward in the guide grove 21 of the left guide rail 13, and the thrust member 68 in the guide groove 21 of the right guide rail 13. Since the traction rail 39 of the other window shade web 37 is conducted in the guide grooves 21, now this traction rail 39 is taken along by the two thrust members 67 and 68. The result of this is that now the window shade web 37 is stretched in front of the rear window.

The window shade web 37 has a different transparency to light than the window shade web 28. For example, the window shade web 37 can be completely opaque, so that any entry of light into the vehicle interior is prevented. Such an operating position is particularly advantageous when the car is parked, because it is possible by means of this to prevent the heating of the interior by the radiation of light through the rear window.

The entry of heat by radiation can be further reduced if the outward facing side of the window shade web 37 is additionally metallized for reflecting infrared radiation.

Retraction of the window shade web 37 takes place in the respectively opposite manner.

Since because of assembly tolerances it is not always assured that the thrust members 67 and 68 lift the respective traction rail 31 or 39 exactly parallel in respect to the associated windup shaft 25 or 26, tilting of the respective traction rail 31 or 39 in respect to the associated windup shaft 25, 26 can occur. Without corrective action, the tilting would lead to obliquely extending waves or folds in the respective window shade web. However, since the two windup rollers 25 and 26 are pivotably received in the seating hoop 24, the windup shaft can align itself in a limited manner obliquely, and therefore be positioned exactly parallel with the respective traction rail 31, 39. Obliquely extending tension in the window shade web is prevented.

The hoop is biased into the centered position with the aid of the two springs 51 and 52. Tumbling of the hoop around the transverse axis, and therefore clattering of the hoop during driving is prevented.

Figure 6:
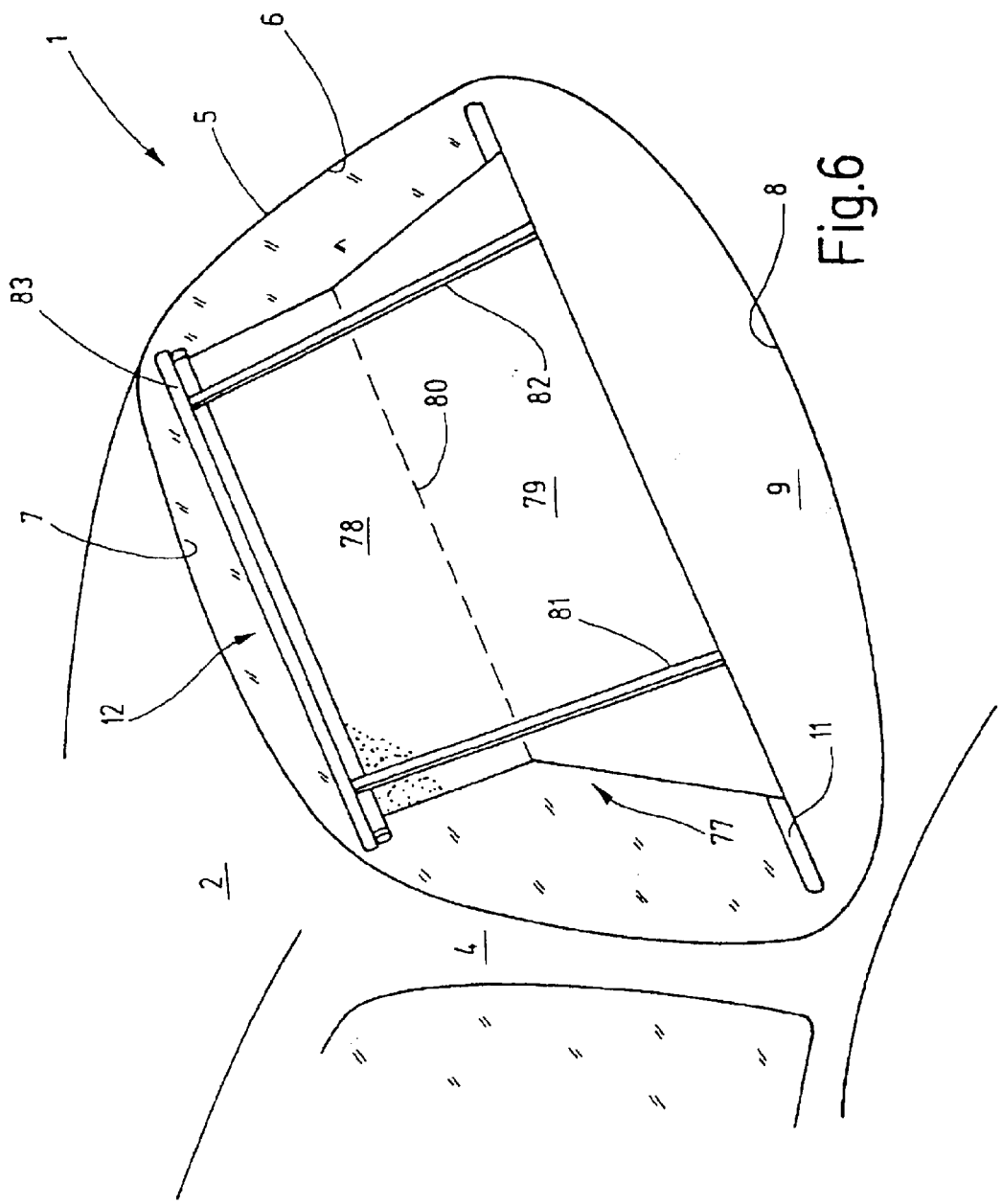
FIG. 6 shows a passenger car in a perspective rear view illustrating another exemplary embodiment of the rear window windup shade in accordance with the invention.
Figure 7:
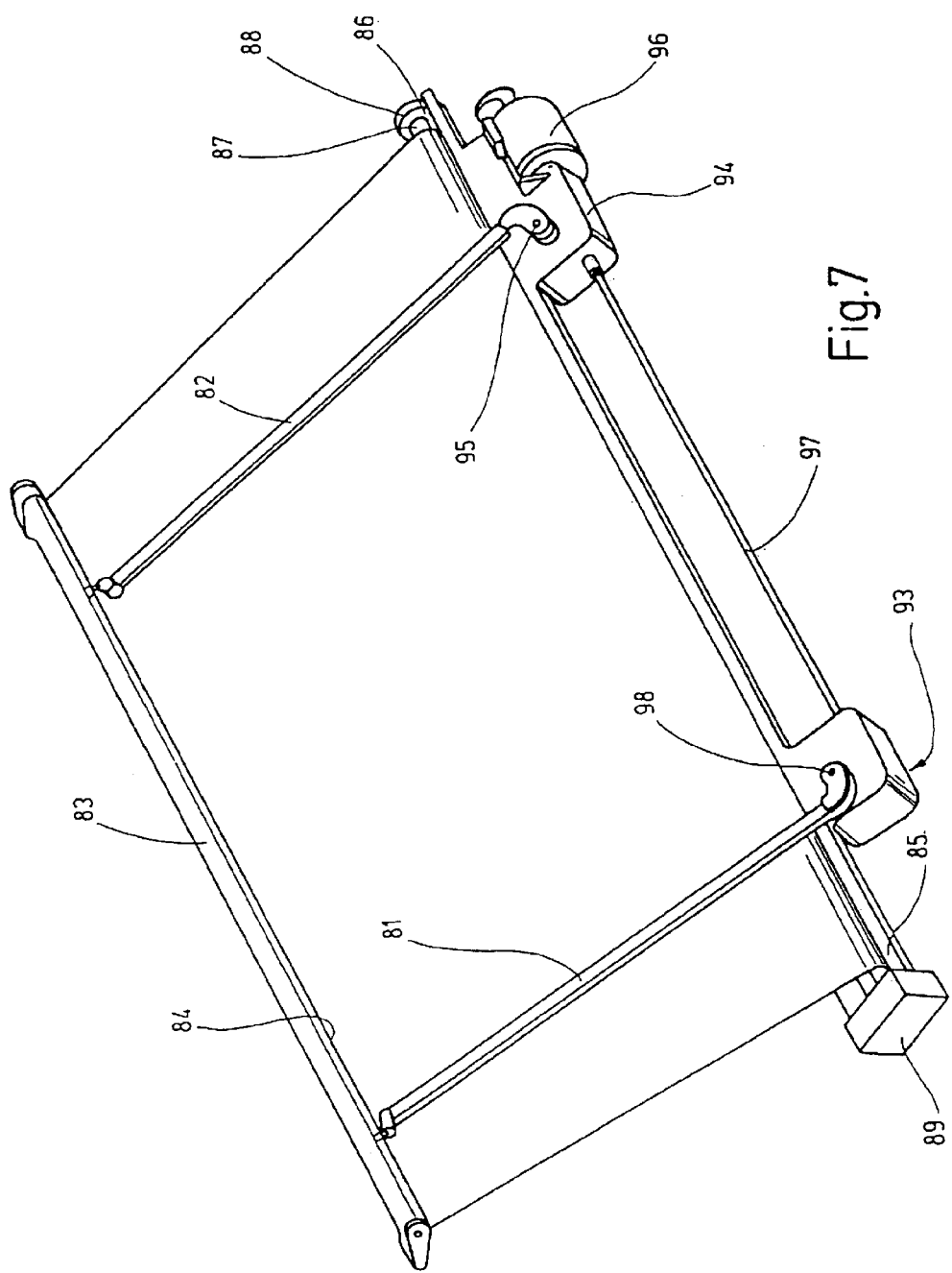
FIG. 7 illustrates the rear window windup shade in FIG. 6 in a perspective general representation.
Figure 8:
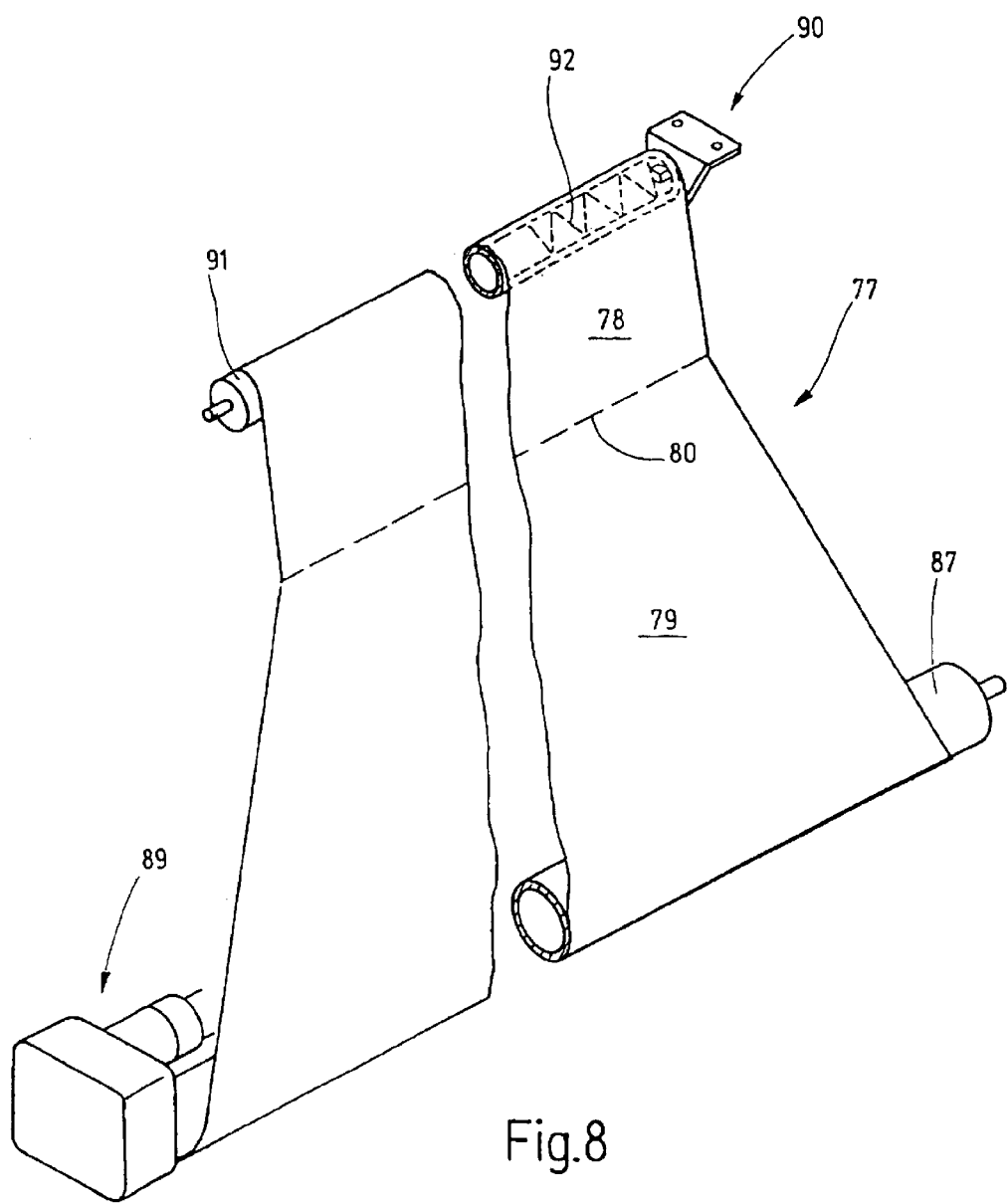
FIG. 8 illustrates the drive mechanism of the rear window windup shade in FIG. 6 in a greatly schematized perspective representation.

A further exemplary embodiment of the rear windup window shade 12 is represented in FIGS. 6–8. To the extent that already described components are repeated there, they are provided with the same reference numerals and will not be explained again.

In accordance with FIG. 6, a windup window shade means 77, which is composed of two window shade webs 78 and 79, which are connected with each other along a connecting line 80, are part of the rear windup window shade 12. The window shade web 78, which can be partially seen, is rectangularly cut and lets more light through than the window shade web 79, which is cut in a trapezoidal shape.

The windup window shade means 77 is maintained stretched with the aid of two pivot levers 81 and 82. For this purpose the pivot levers 81 and 82 act on a pull-out rail, or traction rod, 83.

FIGS. 7 and 8 show in detail the construction of the rear windup window shade 12 of FIG. 6. The traction rod 83 is provided with a groove 84 which is open toward the bottom and is slidingly engaged by the free ends of the two pivot levers 81 and 82, which can be pivoted in opposite directions. During the retraction and extension of the rear windup window shade 12, the pivot levers 81 and 82, together with the windup window shade means 77, move out of, or into the outlet slit 11.

A base 85 is attached below the rear window shelf 9, which contains a longitudinal groove 86, in which a windup shaft 87 is rotatably seated. To this end, one end of the base is provided with a seating element 88, and the other end with a gear motor 89, on whose output shaft the windup shaft 87 is seated, fixed against relative rotation.

The windup window shade means 77 is fastened with one edge on the windup shaft 87.

Two bearing blocks, of which only the bearing block 90 can be seen in FIG. 8 for reasons of representation, are fastened on the underside of the traction rod 83. A further windup shaft 91 is rotatably seated, fixed against relative rotation, between the bearing blocks 90. The windup shaft 91 is tube-shaped and houses a spring drive 92 in the form of a helical spring in its interior. The same as the helical spring 27, one end of the helical spring is connected, fixed against relative rotation, with the windup shaft 91, while its other end is immovably connected with the bearing block 90.

The windup window shade means 77 is maintained stretched between the windup shaft 87 and the windup shaft 91, wherein the spring drive 92 takes care of the biasing.

Two angular gears 93 and 94 are located at a distance from each other on the base 85. The angular gear 94 has an output shaft 95, on which the pivot lever 82 is seated, fixed against relative rotation. An electric motor 96 is connected to the input side of the angular gear 94, so that the output shaft 95 can be selectively caused to rotate. A clutch shaft 97 connects an extension of the input shaft of the angular gear 94 with the input of the angular gear 93.

The angular gear 93 also has an output, or bearing shaft 99, to which the pivot shaft 81 is attached, fixed against relative rotation. The shafts 95 and 99 lie parallel with each other and at right angles in respect to the longitudinal extension of the windup shaft 87. They respectively rotate in opposite directions.

To explain the mode of operation of the rear windup window shade 12 it should be assumed that the pivot levers 81 and 82 are in their position of rest, in which they extend approximately parallel in respect to the windup shaft 87. The windup shaft 87 has been rotated in such a way that the windup window shade means 77 are wound on the windup shaft 87 as far as the connecting line 80. With this, the window shade web 79 is essentially wound on the windup shaft 87.

If, proceeding from there, the motor 96 is energized and begins to rotate, the pivot levers 81 and 82 are raised in opposite directions, wherein initially they lift the traction rod 83 resting on the outlet slit 11 and conduct it in the direction toward the rear roof edge 7. The gear motor 89 is switched off and, based on the movement of the traction rod 83 away from the windup shaft 87, the window shade web 78 is unwound from the windup shaft 91 against the action of the spring drive 92. In its end position, the traction rod 83 extends closely below the rear roof edge 7, as shown in FIG. 6, and a rectangle corresponding to the width of the traction rod 83 is shaded by the window shade web 78.

If the user desires greater shading than that corresponding to the opacity of the window shade web 78, he switches on the gear motor 89, which thereupon rotates the windup shaft 87. The window shade web 79 is unwound from the windup shaft 87 by means of this, while the spring drive 92 takes care of winding the window shade web 78 up to the same extent. The end position is achieved when the connecting line 80 has arrived at the windup shaft 91. When this stage, which can be sensed by switches, is reached, the gear motor 89 is automatically stopped.

The rear window is now shaded by the window shade web 79, which moreover permits a trapezoidal approximation of the window geometry.

For retraction, by switching on the gear motor 89 first a stage is set, in which the window shade web 79 is completely wound on the windup shaft 87. After this stage has been reached, the electric motor 96 is put into operation in the direction of pivoting the levers 81 and 82 in.

It should be noted that all drawings are schematic and not to scale. If nevertheless the distance between the bearing shafts 95 and 99 is less than would correspond to the sum of the two pivot levers 81 and 82, it is easily possible to let the two pivot levers 81 and 82 run in separate grooves, so that their ends do not collide with each other.

Aside from the pivot levers shown, solutions are also conceivable in which the two pivot levers 81 and 82 would be respectively replaced by toggle levers. The lower arm of each toggle lever would then be fastened, fixed against relative rotation, on the shaft 95, or 98, while the upper arm is hinged on the traction rod 83. The two arms of each toggle lever would then be connected with each other by a toggle lever hinge.

Figure 9:
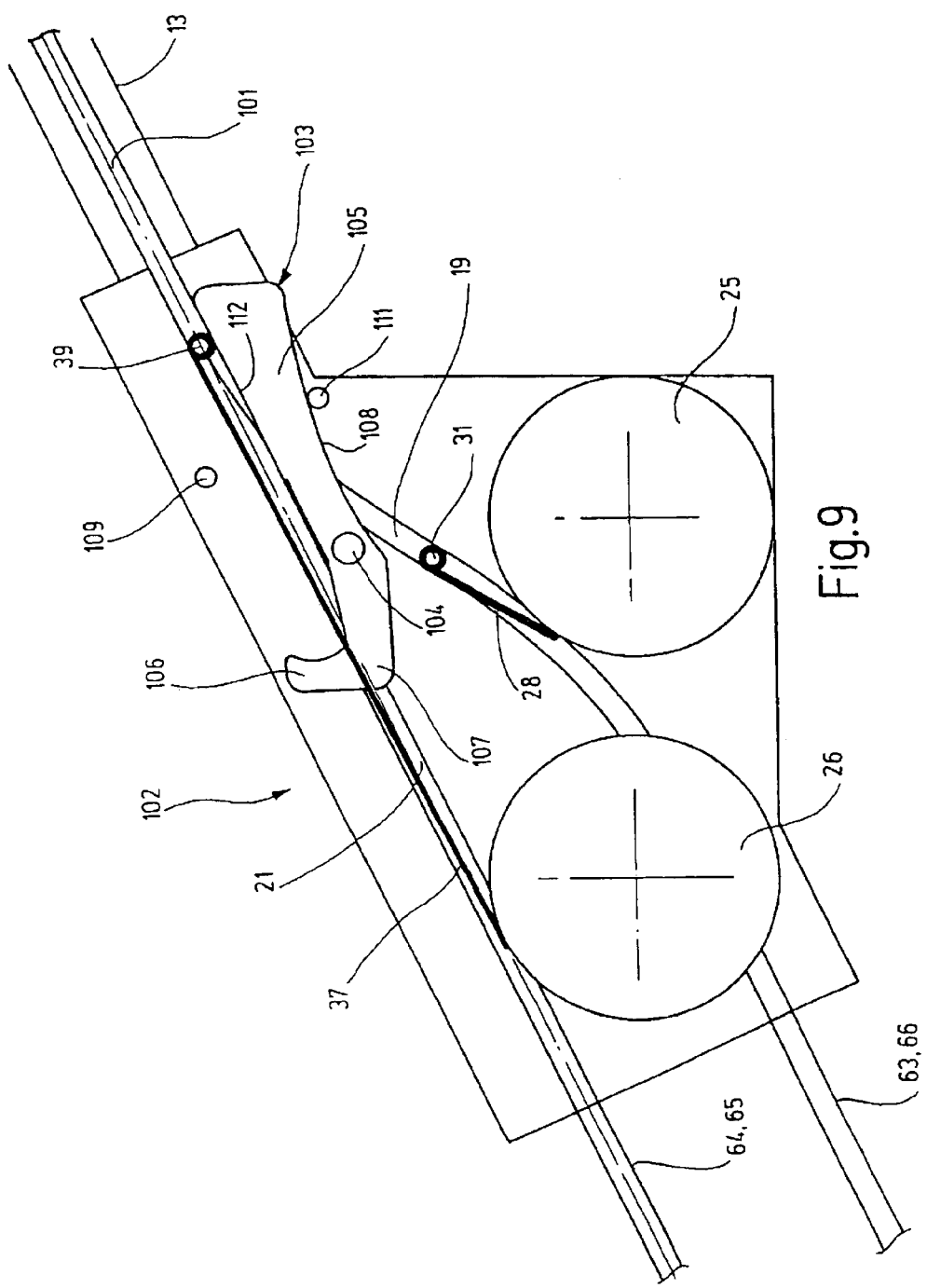
FIG. 9 illustrates a shunt for bringing together the guide grooves of the windup window shade in FIG. 2 in a greatly schematized perspective representation.

FIG. 9 shows an alternative embodiment of the guide means for guiding the traction rods 31 and 39 in the exemplary embodiment in accordance with FIGS. 1 to 5 in a simplified way.

While in the exemplary embodiment in accordance with FIGS. 2 and 5 two guide grooves 19, 21 are contained in each guide rail 13, which extend over the entire length, the exemplary embodiment in accordance with FIG. 9 only has one guide groove 101 in the guide rail 13. At its end toward the windup shaft, the guide rail 13 makes a transition into a shunt 102, in which the guide groove 101 is split into two guide grooves 19 and 21. As in the exemplary embodiment of FIG. 5, the guide tubes 63 to 66 terminate in the analogously identical manner in the extension of the two guide grooves 19 and 21.

In the exemplary embodiment represented, the guide groove 21 extends essentially in a straight line and terminates without a curve in the guide groove 101, while the guide groove 19 represents the fork out of the guide groove 101 and terminates coming from the side.

In order to let the traction rods 31 and 39 enter into the respectively correct guide groove 19, or 21, a pivotably seated shunt tongue 103 is provided. The shunt tongue 103 is seated at shaft 104 and is pivotable around a shaft which lies parallel with the axes of the two windup shafts 25 and 26. The shaft 104 is located on the tongue 103 of the shunt 102 directly before the two grooves 19 and 21 meet.

The shunt tongue 103 represents a two-armed lever with a first section 105 and a second section 107, which contains a hook 106.

The shunt operates as follows:

In the position of rest, when both window shade webs 28 and 37 are retracted, the traction rod 39 lies in the hook 106 and pivots the shunt tongue 103 in a counterclockwise direction in accordance with FIG. 9. The pivot is sufficient for letting the section 105 complement the curved path at the transition from the groove 19 to the groove 101 with its guide face 108. In this position the section 105 rests against a stop 109.

The traction rod 31 can now be pushed away from the windup shaft 25 via the respective thrust member 67 or 68, which is guided by means of the guide tube 63, or 66. In the course of this the guide rod 31 moves after a short distance out of the guide groove 19 into the common guide groove 101.

During retraction, the traction rod 31 runs along the guide face 108 and by means of this is returned into the groove 19 in the further course of this.

When the window shade web 37 is extended, the traction rod 39 moves out of the hook 106, so that the shunt tongue 103 rests with its guide face 108 against a stop 111 because of the action of a spring, not further represented. In this position a guide face 112, which is essentially located opposite the guide face 108, closes the inlet into the guide groove 19.

FIG. 9 represents the state directly after the traction rod 39 has entered the guide groove 101, or the state directly prior to the traction rod 39 passing the guide groove 19 when entering the mouth of the guide groove 21.

Now the window shade web 37 can be extended and also retracted again as previously described. The shunt tongue 103 sees to it that the traction rod 39 comes to rest in the correct guide groove 21 after passing the branch point.

The window shade webs are represented in connection with a rear window. However, it is understood that the windup window shade solution can also be applied in connection with any other window of a passenger car.

Windup window shade is provided with windup window shade means which, in the extracted state, make possible different degrees of opacity at the window. To this end, the two window shade webs can either be wound on separate windup shafts and spread out in the same direction from the same starting point, or the two window shade webs have been connected with each other and, after having been extended, are moved in the manner of a film in front of the window. Two windup shafts are employed in both cases, wherein in the one case the two windup shafts are located directly next to each other, while in the other case the windup shafts are separated from each other during the extension of the shade.

What is claimed is:

1. A windup window shade for regulating the entry of light through a window into the interior of a motor vehicle, comprising:

windup window shade means, comprising first and second window shade webs that are separate from each other, which can be brought into first, second and third different operational states, wherein in the first operational state no reduction of the entry of the light takes place, in the second operational state a reduction of the light entering the interior takes place, and in the third operational state a reduction of the light takes place which differs from the first and second states, drive mechanisms designed for taking the windup window shade means from one of said operational states into another of said operational states, storage means for storing the windup window shade means in at least one of said operational states, and, guide means forming a pair of first guide grooves extending for a distance along a side of the first window shade web, when extended, for guiding a first traction rod, and a pair of second guide grooves extending for a distance along a side of the second window shade web, when extended, for guiding a second traction rod, and the first guide grooves and the second guide grooves terminate in an associated shunt, from which only one said guide groove continues, with the only one said guide groove extending for a further distance along a respective window edge.

2. The window windup shade in accordance with claim 1, wherein one of the window shade webs comprises a woven material or a perforated foil.

3. The window windup shade in accordance with claim 1, wherein one of the window shade webs is essentially completely opaque.

4. The window windup shade in accordance with claim 1, wherein one of the window shade webs is metallized on the side facing away from the interior of the vehicle.

5. The window windup shade in accordance with claim 1, wherein the guide means maintains the windup window shade means in the extended state.

6. The window windup shade in accordance with claim 3, wherein the guide means comprises two guide rails extending laterally next to edges of the window shade webs in the extended state of the windup window shade means.

7. The window windup shade in accordance with claim 5, wherein the traction rods are adjustable in length.

8. The window windup shade in accordance with claim 5, wherein each window shade web has an edge having a respective said traction rod moving along an essentially elongated path when there is a change in one of said operational states.

9. The window windup shade in accordance with claim 1, wherein the drive mechanisms comprise at least one gear motor, by means of which a flexible linearly-shaped thrust member can be selectively moved in the longitudinal direction, one end of the thrust member acting together with an end of one of the traction rods.

10. The window windup shade in accordance with claim 7, wherein two of said linearly-shaped flexible thrust members are provided, the thrust members being movable in opposite directions by the at least one gear motor, wherein one end of one of the thrust members acts together with one end of the traction rod of the first window shade web, and the other end of said one of the thrust members acts together with one end of the traction rod of the second window shade web, and that said two thrust members act together with the ends of the traction rods of the window shade webs.

11. The window windup shade in accordance with claim 7, wherein each of the thrust members is an approximately cylindrical structure provided with teeth on the exterior.

12. The window windup shade in accordance with claim 9, wherein the teeth are formed by a rib extending helically on the exterior.

13. The window windup shade in accordance with claim 7, wherein the thrust members act interlockingly together with the at least one gear motor.

14. The window windup shade in accordance with claim 1, wherein one windup shaft is provided for each said window shade web, with an edge of a respective said window shade web being fastened to a respective said windup shaft.

15. The window windup shade in accordance with claim 12, wherein each said windup shaft has a respective spring drive, by means of which the respective windup shaft is spring-biased in the direction of winding up the respective window shade web.

16. The window windup shade in accordance with claim 12, wherein ends of at least one of the windup shafts are seated in a seating hoop, which is seated, pivotable with respect to an axis of the vehicle, on a base adapted to be fixed to the vehicle, wherein the axis extends at right angles to the respective windup shaft.

17. The window windup shade in accordance with claim 14, wherein the seating hoop is elastically biased toward a centered position by spring means.

* * * * *